Figure 1:
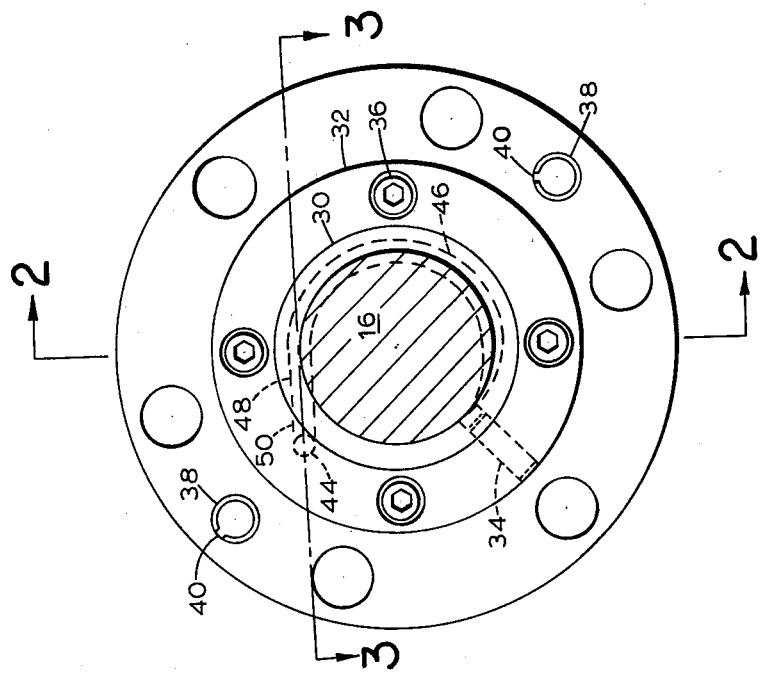

July 21, 1964

D. I. McDONALD 3,141,349

BALL BEARING SCREW AND NUT MECHANISM

Filed Sept. 17, 1962

3 Sheets-Sheet 1

INVENTOR.
DAVID I. McDONALD.

BY *Howard Kiser*
*Jack J. Earl*

ATTORNEYS

July 21, 1964   D. I. McDONALD   3,141,349
BALL BEARING SCREW AND NUT MECHANISM
Filed Sept. 17, 1962   3 Sheets—Sheet 2

July 21, 1964  D. I. McDONALD  3,141,349
BALL BEARING SCREW AND NUT MECHANISM
Filed Sept. 17, 1962  3 Sheets-Sheet 3

United States Patent Office 3,141,349
Patented July 21, 1964

3,141,349
BALL BEARING SCREW AND NUT MECHANISM
David I. McDonald, Cincinnati, Ohio, assignor to The Cincinnati Milling Machine Co., Cincinnati, Ohio, a corporation of Ohio
Filed Sept. 17, 1962, Ser. No. 223,937
8 Claims. (Cl. 74—441)

The present invention relates to a ball bearing screw and nut mechanism and more particularly to an improved nut construction.

Heretofore, preloaded ball nuts in which the balls travel through a plurality of turns of thread have used two separate recirculating ball paths since the normal method of preloading the two halves of a nut toward one another produces an interference that prevents the transfer of balls from the thread of one half to the other half of the nut. The inclusion of two separate ball systems requires that the nut be rather long in relation to the number of turns of thread that are effective to carry the load between the nut and screw since provision for removal and supply of balls to the thread must be made at each end of the two nut sections. Also, in order to complete the two separate ball paths, more parts are required in the fabrication of the nut. These parts often have complicated contours and shapes that are expensive to produce and assemble. Consequently, the cost of preloaded ball nut and screw mechanisms is considerably higher than the cost of the unloaded mechanisms utilizing a single recirculation path for the balls.

It is an object of this invention to provide a preloaded ball bearing nut which has a single recirculating path for balls which extends through both halves of a preloaded nut unit.

A further object is to provide a ball bearing nut of improved construction to reduce the number of parts and to facilitate the manufacture and assembly of the parts.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

The preferred form of this invention is a nut unit comprised of two ball bearing nuts which are received on a screw and separated by a small space at the adjacent end faces. A continuous recirculating ball path is provided in the screw and nut thread from one nut to the other through the small space. The portion of the turn of thread that extends between the two nut portions is slightly enlarged in the axial direction due to the space. Thus, as the balls travel through this space, they are unloaded and reloaded. The preload forces which are maintained in the nut are directed to tend to move the two nut portions apart thereby tending to enlarge the space between the nuts. Therefore, no interference is produced as a result of the preload forces and the freedom of movement of the balls is not affected. Recirculation of the balls through the nuts is maintained by the end caps of the nuts in which the balls are taken from the thread for return along the length of the nuts and by which the balls are resupplied to the thread. The end caps are made as units in which all ball directing surfaces and forms are easily machined due to accessibility. The return path from one end cap to the other is a straight line of travel and therefore is easily provided, even in an internal return type of nut.

Figure 2:
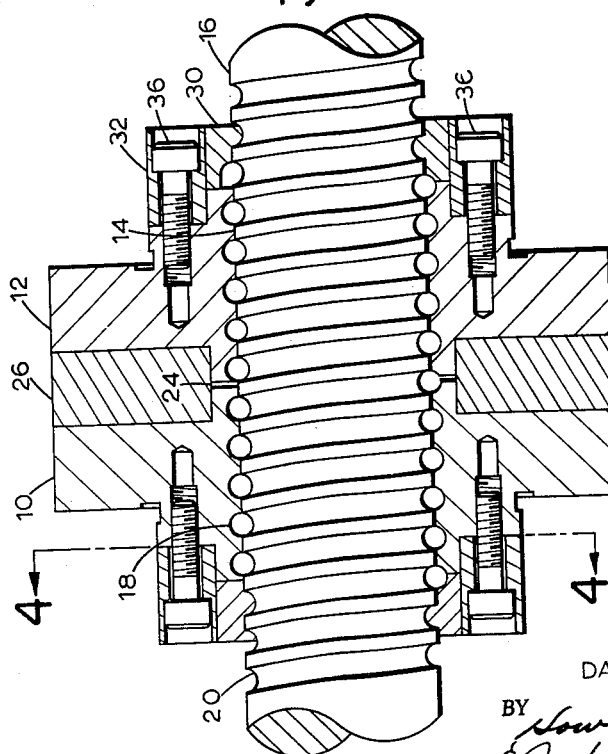
Figure 3:
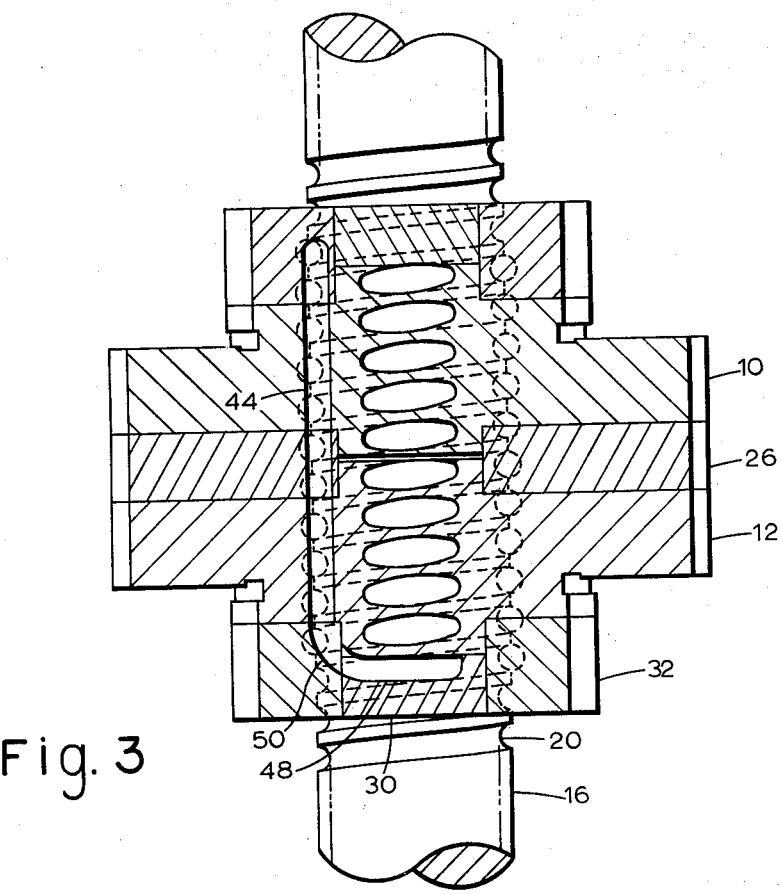
Figure 8:
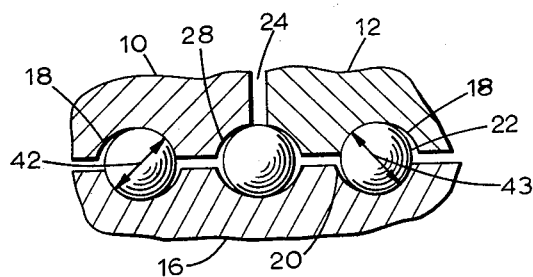
Figures 4, 5:
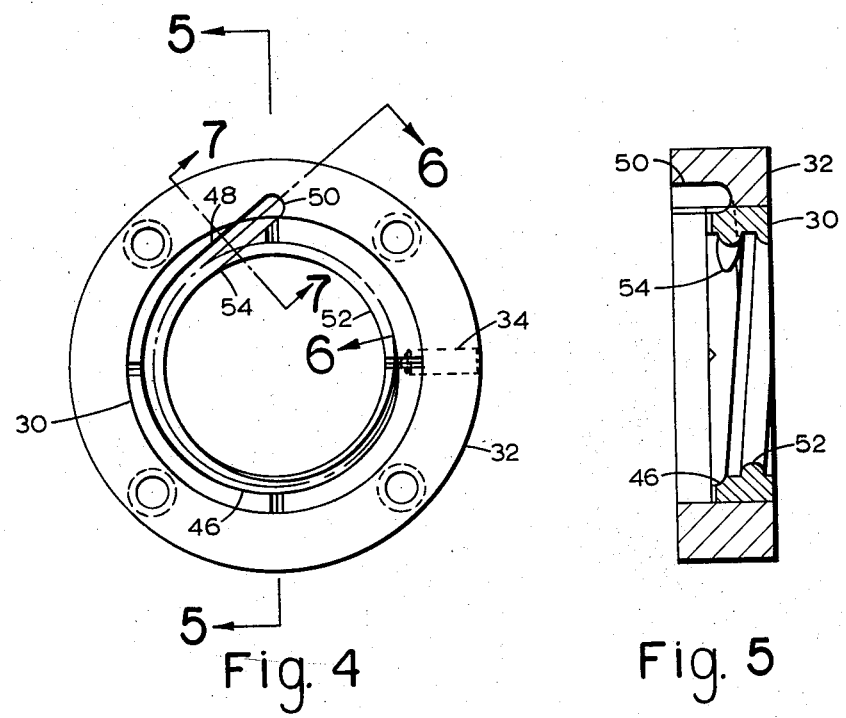
Figure 6:
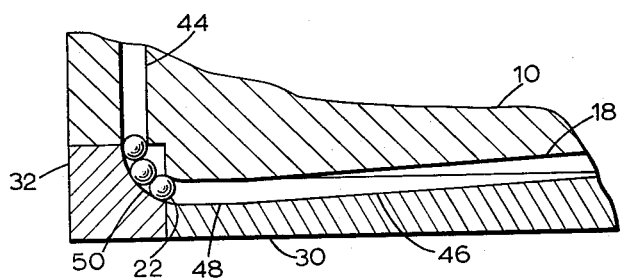
Figure 7:
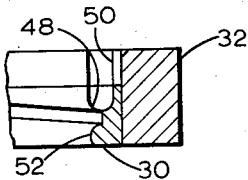

A clear understanding of the construction and operation of this invention can be obtained from the following detailed description in drawings wherein:

FIG. 1 is an end view of a ball bearing nut unit and screw.
FIG. 2 is a section of FIG. 1 on line 2—2.
FIG. 3 is a section of FIG. 1 on line 3—3.
FIG. 4 is an end cap assembly viewed from line 4—4 of FIG. 2.
FIG. 5 is a section of FIG. 4 on line 5—5.
FIG. 6 is a roll-out section of FIG. 4 on line 6—6.
FIG. 7 is a section of FIG. 4 on line 7—7.
FIG. 8 is an enlarged portion of the sectional view of FIG. 2.

As shown in FIG. 2, the preloaded nut unit of this invention is comprised of two nuts 10, 12, each of which has a bore 14 therethrough to loosely receive a screw 16. The bores 14 each have a helical groove 18 therein, the lead of which matches the lead of a helical groove 20 along the screw 16. The grooves 18, 20 together define a ball track through the nuts 10, 12 and around the screw 16. The ball track is filled with anti-friction balls 22 (FIG. 8) that provide the mechanical engagement between the screw 16 and nuts 10, 12 for the transmission of axial forces therebetween. The nuts 10, 12 are separated by a slight space 24 which is maintained by a spacer ring 26 that is received between the mounting flange portions of the nuts 10, 12. The space 24, which need be only a few thousandths of an inch, provides a loose section 28 in that portion of the ball track extending between the two nuts 10, 12 wherein the balls 22 will not transmit an axial load. The balls 22 are retained in the nuts 10, 12 by end caps which are comprised of an outer ring 32 and an inner ring 30 that is made of a material substantially softer than the screw 16. The rings 30, 32 are held together by a pin 34 (FIG. 1), and the rings 32 are fixed to the nuts 10, 12 by machine screws 36.

The nut unit is prestressed when assembled to provide an inherent backlash elimination between the screw 16 and nuts 10, 12. The two nuts 10, 12 are turned together on the screw 16 to tend to compress the spacer 26. The two nuts 10, 12 are then fixed together by a pair of roll pins 38, FIG. 1, which are driven into holes 40 through the nuts 10, 12 and the spacer 26. The axial forces between the two nuts 10, 12 produced as a result of the compressive stresses in the spacer 26 will be directed by the balls 22 to produce a relative torque between the nuts 10, 12 and the torque will be maintained by the shear strength of the pins 38. The result of the preload forces is best seen in FIG. 8 where the balls 22 in the nut 12 are shown to be in contact with the left flank of the groove 18 and the right flank of the groove 20 while in the nut 10, the balls 22 contact the right flank of the groove 18 and the left flank of the groove 20. Since the contact is maintained by the prestressed condition of the mechanism, it will be backlash free as it is used to transmit axial forces one way and the other by relative rotation of the screw 16 and nuts 10, 12.

As has been pointed out, the nuts 10, 12 do not directly contact one another at their adjacent inner ends but are separated by a small space 24. The nuts 10, 12 are aligned in the prestressed condition such that the groove 18 is continuous from one to the other. Since the space 24 is maintained between the nuts 10, 12, the portion of the groove 18 that is embraced between the two will be slightly enlarged. Therefore, as the balls 22 move through the ball track and pass from one of the nuts 10, 12 to the other, they will not be operable to transmit axial forces between the screw 16 and nuts 10, 12 while they pass through the enlarged track portion 28. That is to say, the balls 22 will be unstressed and restressed as they pass from one of the nuts 10, 12 to the other. The preload stress in the balls 22 is indicated by the arrows 42, 43. These arrows show the direction of the compressive forces within the balls 22 when they are under preload conditions and completely within one or the other of the nuts 10, 12 and in the ball track. The arrows 42, 43 reveal that these forces change direction from one nut to the other.

The balls 22 are returned from one end of the ball track to the other end for recirculation therethrough as the nuts 10, 12 are moved along the screw 16. The end caps, each comprised of an inner ring 30 and an outer ring 32, function to retain the balls 22 in the nuts 10, 12 and to direct their movement between the ball track and a ball return hole 44, FIG. 3, which extends parallel to the screw 16 through the nuts 10, 12 and the spacer 26. Each of the inner rings has a ball channel including a surface 46, FIGS. 1, 4, 5, 6, 7, which extends around the opening therethrough and which is on the side of the ring that fits against one of the nuts 10, 12. The surface 46 is produced by a ball end milling cutter. In each end cap, the surface 46 defines an extension of the groove 18 into the inner ring 30, and it progresses to a depth at least equal to the diameter of the balls 22. The balls 22 may pass completely out of the respective one of the nuts 10, 12 and into the respective adjacent inner ring 30. Each of the end cap ball channels also includes a terminal portion 48 which extends tangentially away from the ball track to the respective outer ring 32. A curved notch 50 is formed in each outer ring 32 at the end of the terminal portion 48 to provide a guiding passageway for the balls entering and leaving the return hole 44 which turns the balls through a path of approximately ninety degrees. This notch is produced by a plunge cut of a peripheral milling cutter having a semicircular profile. The flow of balls through the notch 50 is smooth and without jamming since each ball is held against the curved surface of the notch 50 by the preceding and succeeding balls which are in contact therewith since all of the ball track and recirculating spaces are completely filled with balls 22. The position of the balls 22 in the notch 50 is shown in FIG. 6. The surfaces 46, 48, notches 50 and return hole 44 then furnish a complete return path from end cap to end cap in the nut mechanism through which balls 22 may be recirculated from one end of the ball track to the other end thereof.

A male thread 52 is formed through the opening in each of the inner rings 30, and it mates with the groove 20 in the screw 16. The male thread 52 serves two purposes. Being made of a material substantially softer than the screw 16, in the example shown, a tough, oil resistant plastic, it functions to wipe the groove 20 clean and thereby to prevent foreign material from entering into the nuts 10, 12. The thread 52 intersects the surface 46 and at the point 54 at which the terminal portion 48 leaves in a tangent direction, it acts as a plow for directing the balls away from the groove 20 in a smooth flow. This is the second function of the thread 52.

As the nuts 10, 12 and screw 16 are relatively rotated, the balls 22 pass from one nut into a space formed between the groove 20 in the screw 16 and the surface 46 in one end cap. From there, the balls 22 are directed by the projection of the thread 52 into the tangent terminal portion 48 which ends at a curved notch 50 in an outer ring 32. That notch 50 turns the balls 22 into the return hole 44. At the other end of the hole 44, the notch 50 in the outer ring 32 of the other end cap turns the balls into the tangent portion 48 of the surface 46 which then directs the balls onto the groove 20 for movement between the nuts 10, 12 and screw 16. This recirculation of the balls 22 occurs at all times that the nuts 10, 12 and screw 16 are relatively rotated since the balls 22 completely fill the thread ball track and the various portions of the return path described.

What is claimed is:
1. A preloaded recirculating ball bearing screw and nut unit comprising in combination:
   (a) a screw having a helical groove extending therealong,
   (b) a pair of nuts, each of said nuts having a bore therethrough to loosely receive said screw and a helical groove in said bore of the same lead as said screw helical groove,
   (c) a plurality of balls received between said screw and nut helical grooves to effect a threaded engagement for transmission of relative axial forces therebetween,
   (d) means to maintain said nuts in alignment on said screw with a relative torque therebetween tending to move said nuts apart whereby said screw and nut grooves define a continuous ball track through said nuts and a preload force is produced between said screw and each of said nuts, and
   (e) means to recirculate said balls from one end of said ball track to the other end thereof when said nuts and screw are relatively rotated.
2. The combination of claim 1 wherein:
   (a) said nuts are slightly separated by a space that is effective to produce a clearance in said ball track whereby the balls received in said track intermediate said nuts are inoperative to transmit axial forces between said nuts and screw.
3. The combination of claim 1 wherein:
   (a) said aligning means includes a spacing member compressed between said nuts to produce a constant force tending to separate said nuts, said constant force being directed by said balls in said track to tend to produce a relative rotation of said nuts in opposite directions whereby said relative torque is produced.
4. The combination of claim 1 wherein:
   (a) said aligning means includes a pin received between said nuts having sufficient shear strength to prevent said relative torque from shifting said nuts out of alignment whereby said ball track is maintained continuous through said nuts.
5. The combination of claim 1 wherein:
   (a) said recirculating means includes,
      (1) a ball return hole through each of said nuts substantially parallel to the screw, said aligning means maintaining said ball return holes in axial alignment,
      (2) an end cap secured to each of said nuts, each of said end caps having a ball reversing channel therein to direct balls between an end of said ball track and said ball return hole of the respective nut, and
   (b) said balls also fill said return holes and reversing channels.
6. In combination with a screw having a helical ball bearing groove of a constant lead therealong, a ball bearing nut comprising:
   (a) a body having a bore therethrough loosely receiving said screw and having a helical ball bearing groove in said bore with the same lead as said screw groove, said helical grooves together defining a ball track through said body,
   (b) a ball return hole through said body substantially parallel to said screw receiving bore,
   (c) an end cap secured to said body and having a male thread mating with said helical screw groove,
   (d) a channel in said end cap, said channel with said screw groove defining a helical continuation of said ball track, said channel having a terminal portion extending substantially tangentially from said helical continuation for communication with said ball return hole, said male thread and channel intersecting whereby said mole thread defines a plow in said screw groove for directing balls therefrom into said terminal portion, and (e) a plurality of balls filling said ball track, channel, and return hole for recirculation therethrough when said nut and screw are relatively rotated, said balls in the ball track effecting transmittal of axial forces between said screw and body.

7. The combination of claim 6 wherein:
(a) said end cap is comprised of
  (1) an outer ring secured to said body, and
  (2) an inner ring secured in said outer ring, said inner ring substantially softer than said screw,
(b) said channel is formed in an end face of said inner ring adjacent to said body,
(c) said male thread is formed through said inner ring to wipe said screw groove, and
(d) a curved notch is formed in said outer ring at the extreme of the terminal portion of said channel to direct said balls from said channel into said return hole when said screw and nut are relatively rotated.

8. In combination with a screw having a helical ball bearing groove of a constant lead therealong, a preloaded ball bearing nut unit comprising:
(a) a pair of nuts, each of said nuts having a bore therethrough to loosely receive said screw and a helical groove in said bore having the same lead as said screw groove, said helical grooves together defining a ball track through said nuts along said screw,
(b) a plurality of balls received in and filling said ball track to effect a threaded engagement for transmission of relative axial forces therebetween,
(c) a spacing member compressed between said nuts to produce a constant force tending to separate said nuts, said constant force being directed by said balls in said ball track to produce a relative torque between said nuts, said spacing member also operable to hold said nuts slightly separated whereby the balls received in said track between said nuts are inoperative to transmit axial forces between said screw and nuts, (d) a pin received between said nuts having sufficient shear strength to prevent said relative torque from shifting said nuts out of alignment whereby said ball track is maintained continuous through said nuts, (e) a ball return hole extending through said nuts and spacing member parallel to said bores in said nuts, (f) a pair of end caps, one of said end caps fixed to each of said nuts at an outer end thereof, each of said end caps having,
  (1) an outer ring and
  (2) an inner ring substantially softer than said screw, (g) a channel in said inner ring, said channel with said screw groove defining a continuation of said ball track and having a terminal portion extending substantially tangentially from said helical continuation, (h) a male thread through said inner ring to wipe said screw groove and intersecting said channel thereby defining a plow for directing balls therefrom into said terminal portion, and (i) a curved notch formed in said outer ring at the extreme of said terminal portion and at the end of said ball return hole to direct balls between said channel and ball return hole, said balls also filling said end cap channels, notches and said return hole and recirculating through said ball track when said screw and nut are relatively rotated.

References Cited in the file of this patent
UNITED STATES PATENTS

| | | |
|---|---|---|
| 2,674,899 | Goberneau | Apr. 13, 1954 |
| 2,933,941 | Millns | Apr. 26, 1960 |
| 2,959,976 | Fankl | Nov. 15, 1960 |
| 2,982,145 | Orner | May 2, 1961 |
| 3,053,105 | Cole | Sept. 11, 1962 |